(12) United States Patent
Fujita

(10) Patent No.: US 11,308,356 B2
(45) Date of Patent: Apr. 19, 2022

(54) INFORMATION MANAGEMENT APPARATUS, INFORMATION PROCESSING APPARATUS, AND CONTROL METHOD THEREOF

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 16/892,190

(22) Filed: Jun. 3, 2020

(65) Prior Publication Data
US 2020/0387749 A1 Dec. 10, 2020

(30) Foreign Application Priority Data

Jun. 4, 2019 (JP) .............................. JP2019-104794

(51) Int. Cl.
*G06K 9/62* (2006.01)
*G06N 3/08* (2006.01)

(52) U.S. Cl.
CPC ......... *G06K 9/6256* (2013.01); *G06K 9/6263* (2013.01); *G06N 3/08* (2013.01)

(58) Field of Classification Search
CPC .. G06K 9/6256; G06K 9/6263; G06K 9/6262; G06K 9/6218; G06N 3/08; G06N 3/063; G06N 3/0454

USPC .......................................................... 382/159
See application file for complete search history.

(56) References Cited

U.S. PATENT DOCUMENTS

| 2018/0336435 A1* | 11/2018 | Takeuchi ............. G06N 3/0454 |
| 2020/0097742 A1* | 3/2020 | Ratnesh Kumar ... G06N 3/0481 |
| 2020/0226421 A1* | 7/2020 | Almazan ................ G06N 3/084 |
| 2021/0056337 A1* | 2/2021 | Ono ......................... G06N 3/04 |

FOREIGN PATENT DOCUMENTS

JP 2017-142739 A 8/2017

* cited by examiner

*Primary Examiner* — Juan A Torres
(74) *Attorney, Agent, or Firm* — Cowan, Liebowitz & Latman, P.C.

(57) ABSTRACT

An information management apparatus comprises a communication unit configured to communicate with a plurality of external apparatuses having learning functions, and a control unit configured to control the communication with the plurality of external apparatuses performed by the communication unit. The control unit, if supervisory data generated when a predetermined external apparatus executes a learning function is received from the predetermined external apparatus via the communication unit, selects, from among the plurality of external apparatuses, an external apparatus, other than the predetermined external apparatus, with which the supervisory data is to be shared, and performs control so that the supervisory data is transmitted to the selected external apparatus.

20 Claims, 9 Drawing Sheets

| GROUP ID | CAMERA ID | LEARNING SUBJECT LABEL |
|---|---|---|
| GROUP X | CAMERA A, CAMERA B, CAMERA C | "KEN", "LISA" |
| GROUP Y | CAMERA A, CAMERA D, CAMERA E | "KINGFISHER" |

| CAMERA ID | SUPERVISORY IMAGE DATA SPECIFICATION |
|---|---|
| CAMERA A | 300x300 (JPEG) |
| CAMERA B | 200x200 (JPEG) |
| CAMERA C | 300x300 (PNG) |
| CAMERA D | 400x400 (JPEG) |
| CAMERA E | 200x200 (PNG) |

FIG. 2C

| CLUSTER ID | LABEL | LEARNING NOTIFICATION COUNT | | | | |
|---|---|---|---|---|---|---|
| | | CAMERA A | CAMERA B | CAMERA C | CAMERA D | CAMERA E |
| 00001 | "KEN" | 832 TIMES | 2132 TIMES | 338 TIMES | 0 TIMES | 0 TIMES |
| 00002 | "LISA" | 543 TIMES | 1825 TIMES | 243 TIMES | 0 TIMES | 0 TIMES |
| 00003 | "KINGFISHER" | 240 TIMES | 0 TIMES | 10 TIMES | 373 TIMES | 129 TIMES |
| 00004 | "PHEASANT" | 125 TIMES | 1 TIMES | 2 TIMES | 146 TIMES | 99 TIMES |

FIG. 2D

| CLUSTER ID | LABEL | LEARNING NOTIFICATION COUNT | | | | |
|---|---|---|---|---|---|---|
| | | CAMERA A | CAMERA B | CAMERA C | CAMERA D | CAMERA E |
| 00001 | "KEN" | 832 TIMES | 2132 TIMES | 338 TIMES | 0 TIMES | 0 TIMES |
| 00002 | "LISA" | 543 TIMES | 1825 TIMES | 243 TIMES | 0 TIMES | 0 TIMES |
| 00003 | "KINGFISHER" | 240 TIMES | 0 TIMES | 10 TIMES | 373 TIMES | 129 TIMES |
| 00004 | "PHEASANT" | 125 TIMES | 1 TIMES | 2 TIMES | 147 TIMES | 100 TIMES |

FIG. 2E

| GROUP ID | CAMERA ID | LEARNING SUBJECT LABEL |
|---|---|---|
| GROUP X | CAMERA A, CAMERA B, CAMERA C | "KEN", "LISA" |
| GROUP Y | CAMERA A, CAMERA D, CAMERA E | "KINGFISHER", "PHEASANT" |

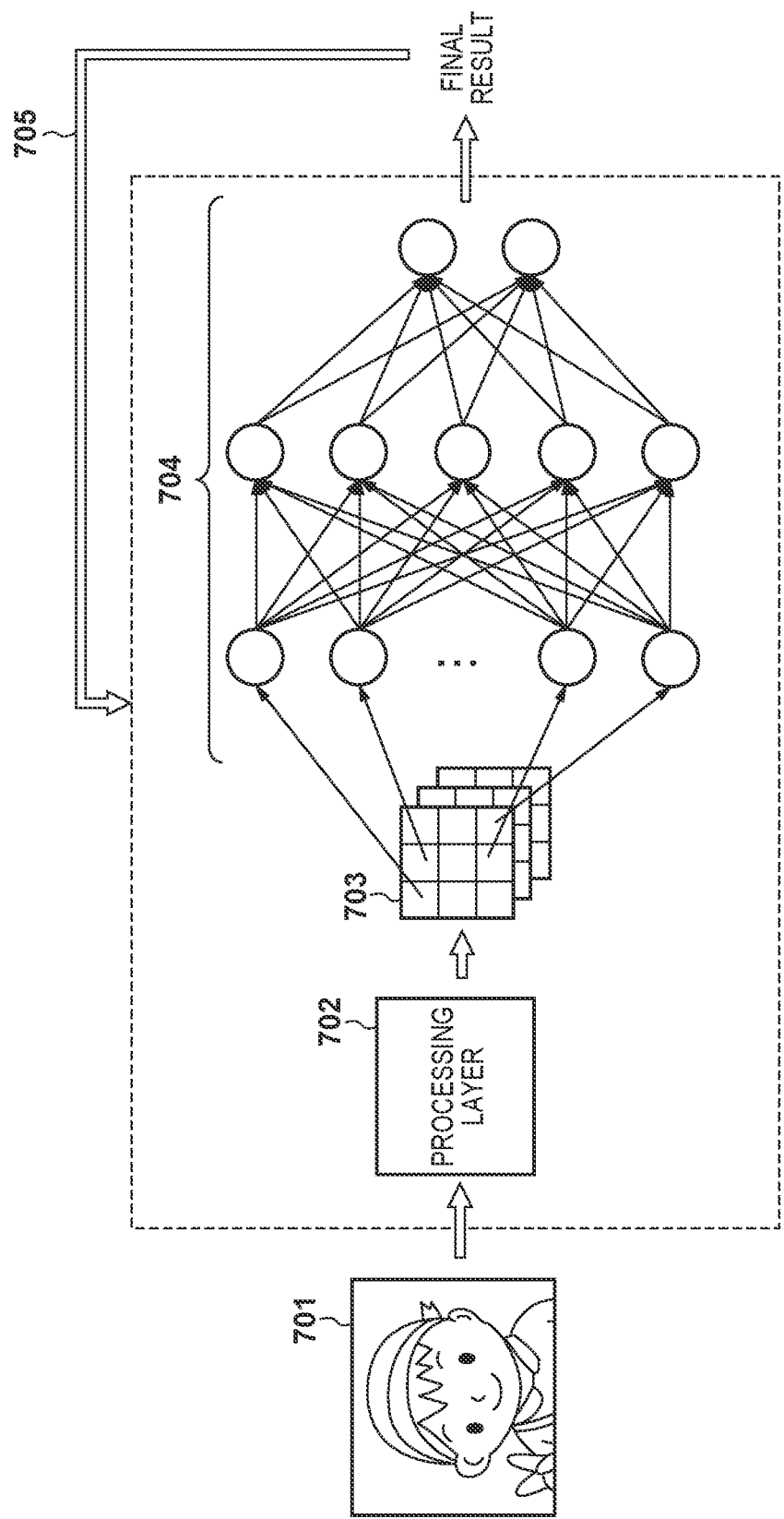

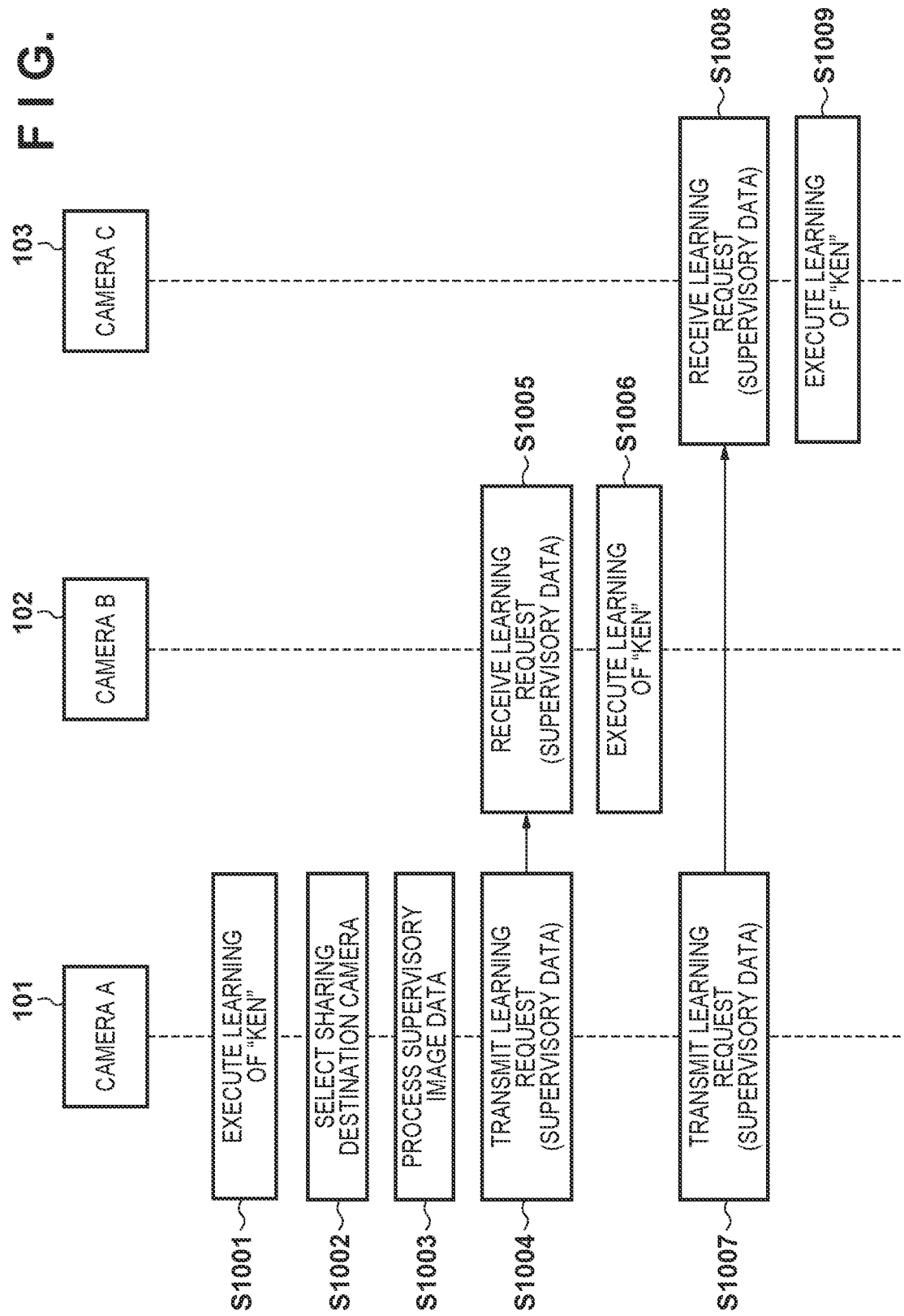

INFORMATION MANAGEMENT APPARATUS, INFORMATION PROCESSING APPARATUS, AND CONTROL METHOD THEREOF

CROSS-REFERENCE TO RELATED APPLICATIONS

This application claims the benefit of Japanese Patent Application No. 2019-104794, filed Jun. 4, 2019 which is hereby incorporated by reference herein in its entirety.

BACKGROUND OF THE INVENTION

Field of the Invention

The present invention relates to techniques for sharing supervisory data among apparatuses having learning functions.

Description of the Related Art

Recent years has seen active development in artificial intelligence (AI) techniques, primarily machine learning. Techniques for automatically recognizing objects (subjects) included in captured images by applying such a learning function to cameras are also being developed.

In order to increase learning accuracy, a large number of images (supervisory images) accompanied by correct answer labels indicating what the objects are need to be prepared. Herein, a pair consisting of a correct answer label and a supervisory image is referred to as supervisory data.

Japanese Patent Laid-Open No. 2017-142739 discloses a technique in which a sufficient amount of supervisory data is collected and accumulated in a common storage apparatus, and the collected supervisory data is disclosed to other apparatuses according to a disclosure level.

If a learning function is applied to a camera, an automatic recognition function matching user preferences is required. This means that the required learning model and supervisory data differ depending on the camera. However, Japanese Patent Laid-Open No. 2017-142739 neither discloses a method for selecting desired supervisory data nor a method for selecting cameras with which supervisory data is to be shared. Thus, additional work, such as selecting desired supervisory data for each camera and selecting cameras with which supervisory data is to be shared, is required.

SUMMARY OF THE INVENTION

The present invention has been made in consideration of the aforementioned problems, and realizes techniques for enabling the selection of supervisory data and the selection of sharing destinations to be executed automatically.

In order to solve the aforementioned problems, the present invention provides an information management apparatus comprising at least one processor or circuit configured to perform operations of the following units: a communication unit configured to communicate with a plurality of external apparatuses having learning functions; and a control unit configured to control the communication with the plurality of external apparatuses performed by the communication unit, wherein the control unit, if supervisory data generated when a predetermined external apparatus executes a learning function is received from the predetermined external apparatus via the communication unit, selects, from among the plurality of external apparatuses, an external apparatus, other than the predetermined external apparatus, with which the supervisory data is to be shared, and performs control so that the supervisory data is transmitted to the selected external apparatus.

In order to solve the aforementioned problems, the present invention provides an information processing apparatus having a learning function, comprising: at least one processor or circuit configured to perform operations of the following units: a communication unit configured to communicate with an external apparatus that manages supervisory data generated when the learning function is executed; and a control unit configured to transmit supervisory data generated when the learning function is executed to the external apparatus via the communication unit.

In order to solve the aforementioned problems, the present invention provides an information processing apparatus having a learning function, comprising at least one processor or circuit configured to perform operations of the following units: a communication unit configured to communicate with an external apparatus having a learning function; and a control unit configured to control the communication with the external apparatus performed via the communication unit, wherein the control unit selects, from among a plurality of external apparatuses, an external apparatus with which supervisory data generated when the information processing apparatus executes the learning function is to be shared, and performs control so that the supervisory data is transmitted to the selected external apparatus via the communication unit.

In order to solve the aforementioned problems, the present invention provides a method of controlling an information management apparatus that includes a communication unit configured to communicate with a plurality of external apparatuses having learning functions and that controls the communication with the plurality of external apparatuses performed by the communication unit, the method comprising: if supervisory data generated when a predetermined external apparatus executes a learning function is received from the predetermined external apparatus via the communication unit, selecting, from among the plurality of external apparatuses, an external apparatus, other than the predetermined external apparatus, with which the supervisory data is to be shared; and transmitting the supervisory data to the selected external apparatus.

In order to solve the aforementioned problems, the present invention provides a method of controlling an information processing apparatus having a learning function, comprising: communicating with an external apparatus that manages supervisory data generated when the learning function is executed; and transmitting supervisory data generated when the learning function is executed to the external apparatus.

In order to solve the aforementioned problems, the present invention provides a method of controlling an information processing apparatus having a learning function, a communication unit configured to communicate with an external apparatus having a learning function, and a control unit configured to control the communication with the external apparatus performed via the communication unit, the method comprising: selecting, from among a plurality of external apparatuses, an external apparatus with which supervisory data generated when the information processing apparatus executes the learning function is to be shared; and transmitting the supervisory data to the selected external apparatus via the communication unit.

In order to solve the aforementioned problems, the present invention provides a non-transitory computer-readable storage medium storing a program for causing a computer to execute a method of controlling an information management apparatus that includes a communication unit configured to communicate with a plurality of external apparatuses having learning functions and that controls the communication with the plurality of external apparatuses performed by the communication unit, the method comprising: if supervisory data generated when a predetermined external apparatus executes a learning function is received from the predetermined external apparatus via the communication unit, selecting, from among the plurality of external apparatuses, an external apparatus, other than the predetermined external apparatus, with which the supervisory data is to be shared; and transmitting the supervisory data to the selected external apparatus.

In order to solve the aforementioned problems, the present invention provides a non-transitory computer-readable storage medium storing a program for causing a computer to execute a method of controlling an information processing apparatus having a learning function, comprising: communicating with an external apparatus that manages supervisory data generated when the learning function is executed; and transmitting supervisory data generated when the learning function is executed to the external apparatus.

In order to solve the aforementioned problems, the present invention provides a non-transitory computer-readable storage medium storing a program for causing a computer to execute a method of controlling an information processing apparatus having a learning function, a communication unit configured to communicate with an external apparatus having a learning function, and a control unit configured to control the communication with the external apparatus performed via the communication unit, the method comprising: selecting, from among a plurality of external apparatuses, an external apparatus with which supervisory data generated when the information processing apparatus executes the learning function is to be shared; and transmitting the supervisory data to the selected external apparatus via the communication unit.

According to the present invention, the selection of supervisory data and the selection of sharing destinations can be executed automatically.

Further features of the present invention will become apparent from the following description of exemplary embodiments (with reference to the attached drawings).

BRIEF DESCRIPTION OF THE DRAWINGS

FIG. 1 is a system configuration diagram according to the first embodiment.

FIGS. 2A to 2E are diagrams illustrating examples of management tables according to the first and second embodiments.

FIG. 7 is a diagram describing image learning processing using a neural network according to the first and second embodiments.

FIG. 10 is a diagram illustrating an example of a sequence of learning processing in the system according to the second embodiment.

DESCRIPTION OF THE EMBODIMENTS

Figures 1, 2A, 2B:
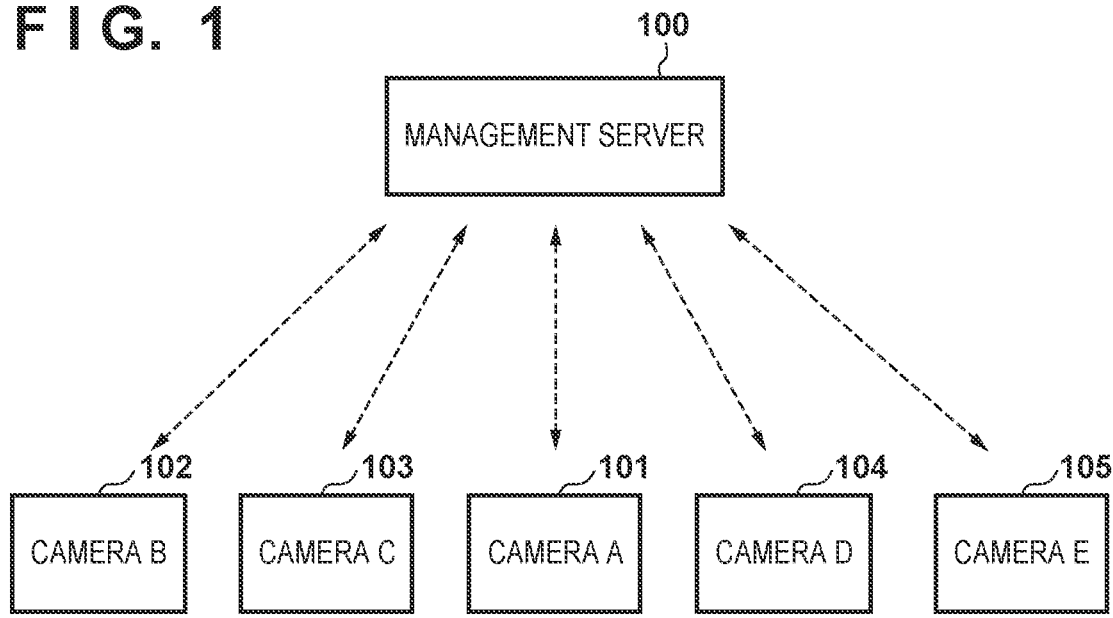

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment will be described in the following.

In the following, an example of a system in which a management server and digital cameras, acting as an information management apparatus and information processing apparatuses, according to the present embodiment, are connected so as to be capable of communicating with each other will be described. Note that the information processing apparatuses according to the present embodiment are not limited to digital cameras, and application to other apparatuses having a camera function, such as mobile phones and smartphones, which are a type of mobile phone, tablets, personal computers (PCs), and personal digital assistants (PDAs), is also possible.

System Configuration

First, a system configuration according to the present embodiment will be described with reference to FIG. 1.

The system according to the present embodiment includes a management server 100 and cameras 101 to 105. The cameras 101 to 105 (cameras A to E) are each capable of mutually communicating with the management server 100. In the present embodiment, it is assumed that the management server 100 is installed on the Internet and the cameras 101 to 105 have a communication function capable of connecting to a network such as the Internet. However, the cameras 101 to 105 do not necessarily need to have a built-in communication function, and may, for example, be configured so as to have a wireless LAN communication function and to communicate with the management server 100 via a device, such as a smartphone, that has a tethering function.

The cameras 101 to 105 each have a unique learning model, and have a learning function for recognizing subjects using captured images and supervisory data. A user of a camera can register desired subjects (images including the subjects) to the learning model of the camera as learning targets. Accordingly, for example, the camera can automatically focus on subjects that the user likes during shooting, and captured images including subjects that the user likes can be selectively and automatically classified and stored to specific folders after shooting. Since different users like different subjects, the content of learning, i.e., the learning model, differs between cameras possessed by individual users. For the learning of images, a technique called a convolutional neural network (CNN), which is a known technique in the field of machine learning, is used. The details of the learning processing will be described later in FIG. 7.

The cameras 101 to 105 form groups with cameras that have common learning-target subjects. Information regarding how the groups are formed is managed by the management server 100.

FIG. 2A illustrates an example of the information indicating how groups are formed (referred to hereinafter as a "group management table"), which is managed by the management server 100. As illustrated in FIG. 2A, group X is formed by cameras A, B, and C (cameras 101, 102, and 103), and learning subject labels "KEN" and "LISA" are common to the group. On the other hand, group Y is formed by cameras A, D, and E (cameras 101, 104, and 105), and a learning subject label "KINGFISHER" is common to the group. A learning subject label is a piece of information for uniquely indicating a learning-target subject image. For example, the group X is a group formed by relatives of the user of camera A (referred to hereinafter as a "user A"; the users of other cameras will also be referred to using the same alphabetical characters as those of the corresponding cameras), and user A, user B, and user C are the father, mother, and grandfather of "KEN" and "LISA", respectively. "KEN" and "LISA" are labels indicating the learning-target subject images common to group X. On the other hand, group Y, for example, is a group formed by a group of people having the hobby of shooting pictures of wild birds, and user A, user D, and user E are members of a hobby group. "KINGFISHER" is a label indicating the learning-target subject image common to group Y.

FIG. 2B illustrates an example of information regarding the data specifications of supervisory images supported by the learning models of the cameras (referred to hereinafter as a "supervisory image data specification management table"), which is managed by the management server 100. The data specifications of supervisory images include specifications regarding resolution and data format. As illustrated in FIG. 2B, the data specifications of supervisory images that can be used for learning differ between the learning models of the cameras.

The management server 100 has a unique learning model, and has a function of performing clustering on supervisory image data transmitted from the cameras 101 to 105. Clustering is also called unsupervised learning, and is processing in which feature points of images are extracted, and the images are classified into groups (clusters) of similar images based on a predetermined criterion. The management server 100 has a function of automatically updating learning subject labels common to a group by means of clustering. The details of the automatic update processing will be described later in FIG. 8.

Camera Configuration

Next, the configuration and functions of the cameras 101 to 105 in the system according to the first embodiment will be described with reference to FIG. 3.

A control circuit 300 controls the entire camera by executing control programs stored in a later-described non-volatile memory 301. The control circuit 300 includes one or more processors such as CPUs and MPUs.

The non-volatile memory 301 is a read only memory (ROM) that stores parameters and various control programs that are executed by the CPU(s) of the control circuit 300.

A work memory 302 is a random access memory (RAM) that temporarily stores data and programs that are necessary for various types of processing performed by the CPU(s) of the control circuit 300. Note that a plurality of pieces of hardware may control the entire apparatus by each handling a portion of the processing, instead of the control circuit 300 controlling the entire apparatus.

A storage medium interface (I/F) 303 controls access to a later-described storage medium 304. In accordance with control by the control circuit 300, the storage medium I/F 303 executes data transfer processing between the work memory 302 and the storage medium 304.

For example, the storage medium 304 is a hard disk or a memory card built into the camera, or a hard disk, a memory card, a USB flash memory, a DVD, a Blu-ray Disc, or the like that is detachable from the camera.

An operation member 305 accepts user operations and notifies the control circuit 300 of the input information. The operation member 305 is an input device such as a touch panel, a button switch, or a cross key.

A display device 306 displays the operation state of the camera, images, etc. The display device 306 is constituted by an LCD, an LED, etc. Furthermore, the display device 306 may have a function of a speaker, etc., capable of outputting audio.

A communication circuit 307 is an interface that connects to external apparatuses, such as the management server 100 and other cameras, and connects to external networks, such as the Internet. In the present embodiment, the communication circuit 307 connects to the management server 100 and other cameras, and transmits/receives captured image data, learning notifications (supervisory data), etc., to/from the management server 100.

An image capturing unit 308 includes an optical lens, a CMOS image sensor, a digital image processing circuit, etc., and generates image data by converting analog signals input via the optical lens into digital data. Image data generated by the image capturing unit 308 is converted into a predetermined format, and is stored in the storage medium 304 as an image file.

Figure 3:
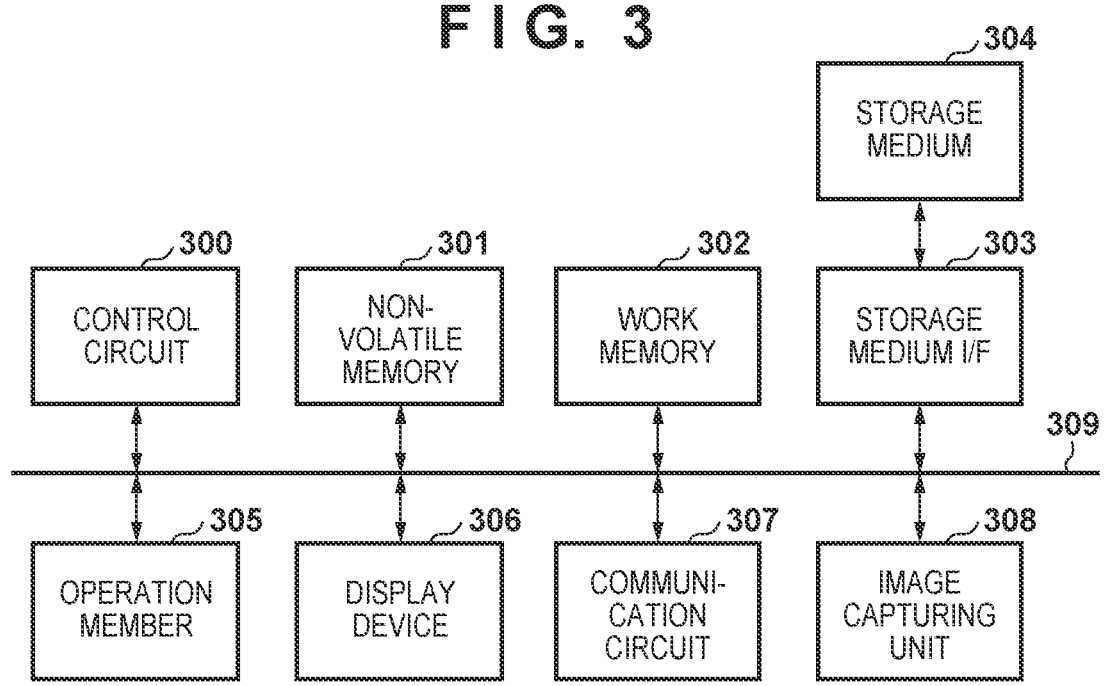
FIG. 3 is a block diagram illustrating an example of a configuration of cameras according to the first and second embodiments.

Note that the hardware configuration illustrated in FIG. 3 is one example, and the cameras 101 to 105 according to the present embodiment may have hardware configurations other than that illustrated in FIG. 3.

An internal bus 309 connects the parts 300 to 303 and 305 to 308 of the camera so as to be capable of exchanging data.

Management Server Configuration

Figure 4:
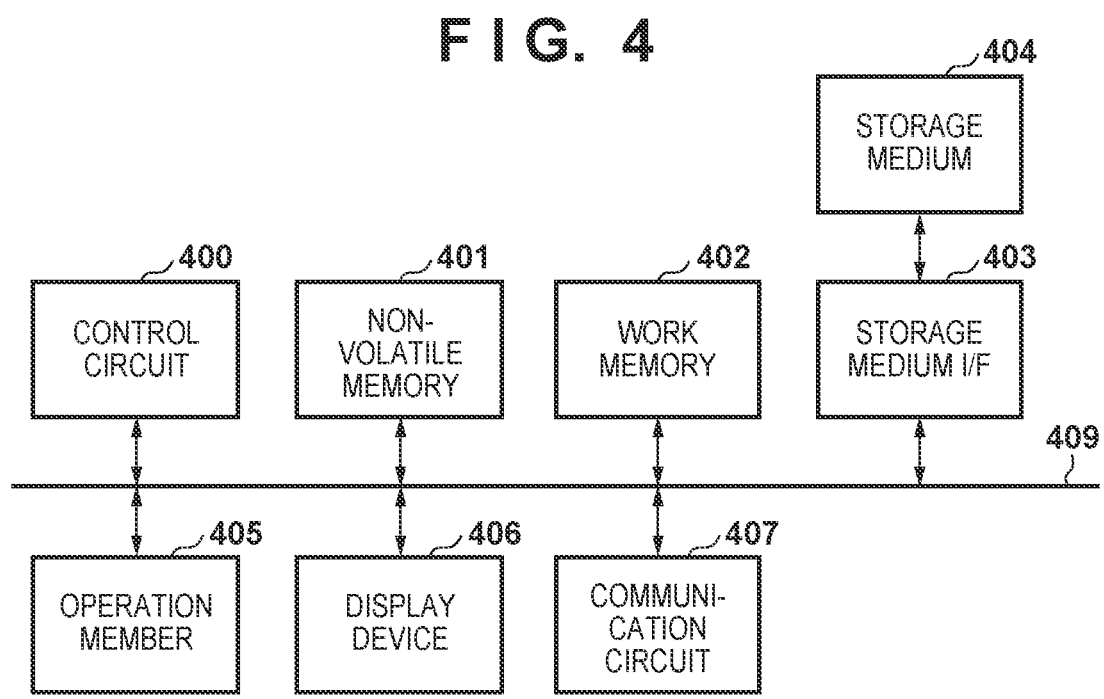
FIG. 4 is a block diagram illustrating an example of a configuration of a management server according to the first embodiment.

Next, the configuration and functions of the management server 100 in the system according to the first embodiment will be described with reference to FIG. 4.

A control circuit 400 controls the entire server by executing control programs stored in a later-described non-volatile memory 401. The control circuit 400 includes one or more processors such as CPUs and MPUs.

The non-volatile memory 401 is a read only memory (ROM) that stores parameters and various control programs that are executed by the CPU(s) of the control circuit 400.

A work memory 402 is a random access memory (RAM) that temporarily stores data and programs that are necessary for various types of processing performed by the CPU(s) of the control circuit 400. Note that a plurality of pieces of hardware may control the entire apparatus by each handling a portion of the processing, instead of the control circuit 400 controlling the entire apparatus.

A storage medium interface (I/F) 403 controls access to a later-described storage medium 404. In accordance with control by the control circuit 400, the storage medium I/F 403 executes data transfer processing between the work memory 402 and the storage medium 404. For example, the storage medium 404 is a hard disk including a large-capacity storage area, etc.

An operation member 405 accepts user operations and notifies the control circuit 400 of the input information. The operation member 405 is an input device such as a button switch, a keyboard, or a mouse.

A display device 406 displays the operation state of the server, etc. The display device 406 is constituted by an LCD, etc. Furthermore, the display device 406 may have a function of a speaker, etc., capable of outputting audio.

A communication circuit 407 is an interface that connects to external apparatuses, such as the cameras 101 to 105, and connects to external networks, such as the Internet. In the present embodiment, the communication circuit 407 connects to the cameras 101 to 105, and transmits/receives captured image data, learning notifications (supervisory data), etc., to/from the cameras 101 to 105.

An internal bus 409 connects the parts 400 to 403 and 405 to 407 of the management server 100 so as to be capable of exchanging data.

Sequence of Learning Processing

Next, an example of a sequence of processing performed by the management server 100 and the cameras A 101 to C 103, in a case in which the cameras A 101 to C 103, among the cameras A 101 to E 105 constituting the system according to the first embodiment, perform image learning, will be described with reference to FIG. 5.

The following describes a sequence of processing that is performed if a given camera executes learning of a subject in the system configuration illustrated in FIG. 1 and that is for causing other cameras desiring to execute learning of the same subject (i.e., other cameras having the same learning subject label) to execute learning of the same level.

Figure 5:
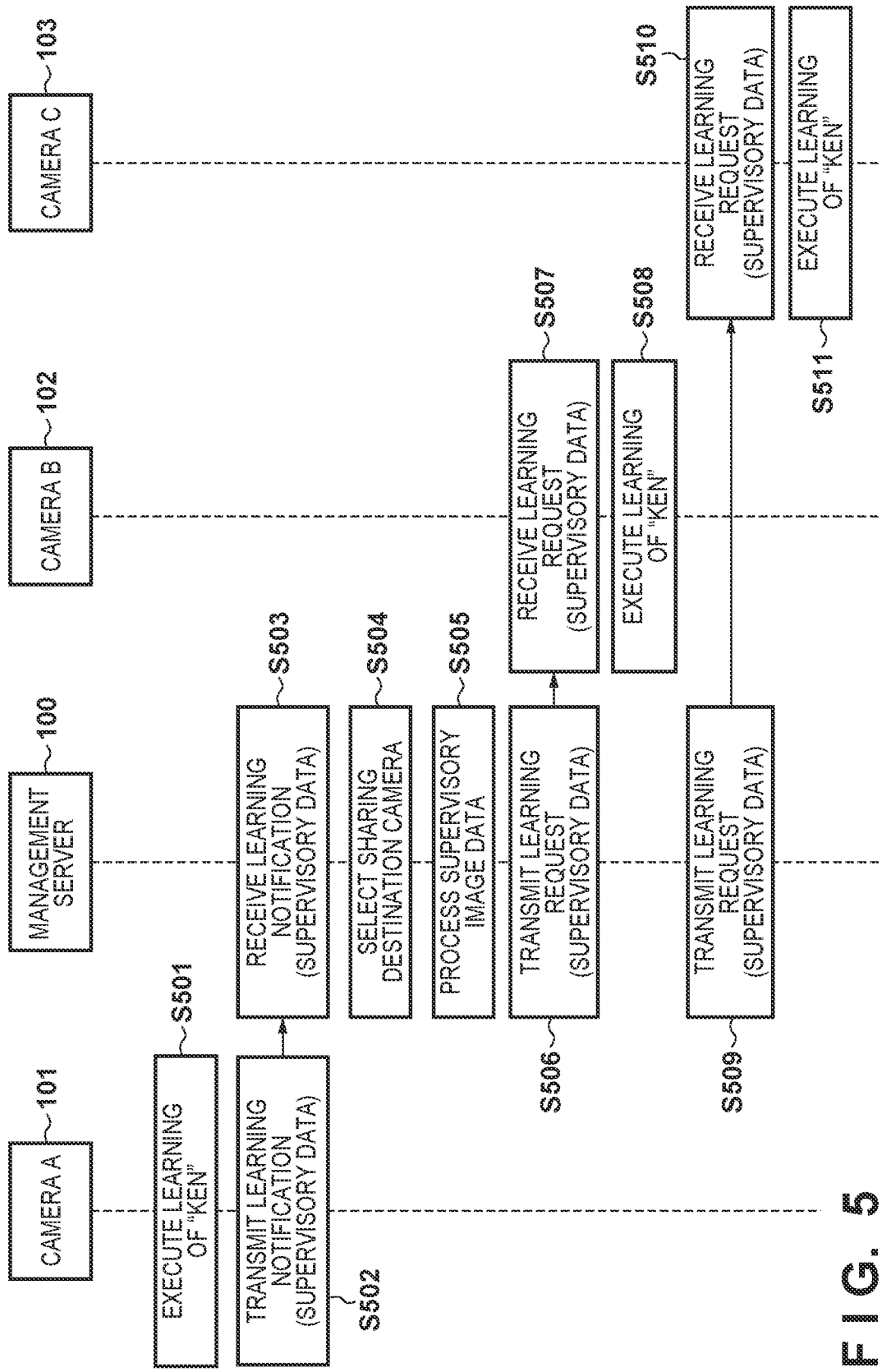
FIG. 5 is a diagram illustrating an example of a sequence of learning processing in the system according to the first embodiment.

For example, FIG. 5 illustrates an example of a sequence of processing in which, in a case in which the camera A 101 executes learning of the subject "KEN", the camera A 101 transmits supervisory image data generated in the learning of the subject "KEN" to the management server 100 and the same is transmitted from the management server 100 to the camera B 102 and the camera C 103 so that learning of the same level can be executed by the camera B 102 and the camera C 103.

In step S501, the camera A 101 executes learning of "KEN" (first learning mode). The learning processing is divided into two parts, one being processing for generating supervisory image data and the other being processing for executing learning using the supervisory image data.

Figure 6A:
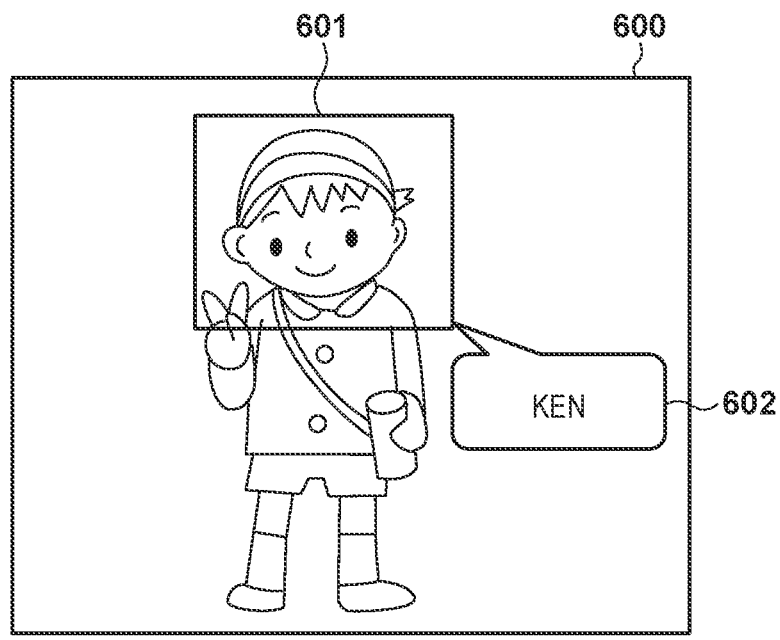
FIGS. 6A and 6B are diagrams illustrating examples of display screens of the cameras according to the first and second embodiments.

First, the processing for generating supervisory data will be described. The user A causes the display device 306 of the camera A 101 to display a learning-target image file, i.e., an image file in which "KEN" appears, specifies a region to be registered as a supervisory image via the operation member 305, and inputs "KEN" with respect to the specified region as learning subject label information. FIG. 6A illustrates an example of an operation screen 600 of the camera A 101 when a supervisory image is registered. The operation screen 600 shows a display screen of the display device 306 of the camera A 101. A specified region 601 indicates the region to be registered as a supervisory image, which has been specified by the user. Label information 602 indicates the learning subject label information input by the user. In such a manner, as a result of the user performing an operation of specifying a registration region and an operation of inputting label information on the operation screen 600, supervisory data constituted by a pair of a supervisory image and learning subject label information is generated.

Next, the processing for executing learning using the supervisory data will be described. As described earlier, the learning processing is executed using a CNN. FIG. 7 is a diagram describing image learning processing using a CNN.

An image 701 is an image corresponding to the supervisory image data generated by the operation described in FIG. 6A. In the above-described processing for generating supervisory data, the supervisory image data 701 is generated in conformity with the supervisory image data specifications supported by the learning model of the camera A 101, which are illustrated in FIG. 2B. Thus, in the present embodiment, the resolution of the supervisory image data 701 is 300×300 and the data format of the supervisory image data 701 is JPEG.

In FIG. 7, a CNN 700 has functional parts 702 to 704. The functional part 702 is a processing layer that repetitively performs convolution processing and pooling processing on the input supervisory image data 701. The convolution processing is processing for condensing feature points from the original image by using a filter. The pooling processing is processing for reducing image size while retaining information regarding important feature points. The functional part 703 is constituted by feature maps that are obtained as a result of the convolution processing and the pooling processing being repeated. The functional part 704 is a fully connected layer configured by multiple layers. Information regarding each pixel of the feature maps 703 is input as input data, and the information is output to all of the nodes of the next layer after multiplication by predetermined weighting factors has been carried out. The final output result is obtained by repeating this processing via a plurality of hidden middle layers. In the present embodiment, the data output as the final result is the probability of the subject image being "KEN". In feedback 705, feedback 705 is executed so that the probability of the subject image being "KEN", which is the result obtained from the fully connected layer 704, increases. The feedback 705 is the processing that is the core of the learning, and is executed repetitively every time a final result is output. By executing the feedback 705, the content of the filter used in the convolution processing in the processing layer 702, the weighting factors in the fully connected layer 704, etc., are adjusted.

In step S502, the camera A 101 transmits, to the management server 100, a learning notification indicating that learning has been executed. The learning notification includes the supervisory data used for the learning. The supervisory data indicates the pair of the supervisory image data 701 described in FIG. 7 and the learning subject label information "KEN".

In step S503, the management server 100 receives the learning notification transmitted by the camera A 101, and acquires the supervisory data included in the learning notification.

In step S504, the management server 100 executes processing for selecting cameras with which the supervisory data included in the learning notification received in step S503 is to be shared. The management server 100 refers to the group management table illustrated in FIG. 2A, and determines whether or not there is a group for which the learning subject label information included in the acquired supervisory data is a learning target common to the group, among the groups to which the camera that is the transmission source of the supervisory data belongs. If there is a group satisfying the condition, the management server 100 selects cameras belonging to the group, excluding the transmission source camera, as sharing destination cameras. Thus, depending upon conditions, there are also cases in which no sharing destination camera is selected, and in such cases, the supervisory data is not shared and processing is terminated. In the current step, the camera A 101 belongs to group X and group Y, and the learning subject label information "KEN" is common to group X among the groups. Thus, the camera B 102 and the camera C 103 are selected as sharing destination cameras.

In step S505, the management server 100 processes the supervisory data to be shared so that the supervisory data is converted into formats that can be input to the learning models of the cameras selected in step S504. The management server 100 refers to the supervisory image data specification management table illustrated in FIG. 2B, and processes the supervisory data so that the resolution is 200×200 and the data format is JPEG if the sharing destination is the camera B 102 and so that the resolution is 300×300 and the data format is PNG if the sharing destination is the camera C 103.

In step S506, the management server 100 transmits, to the camera B 102, a learning request that is a request to execute learning. The learning request includes the supervisory data processed for transmission to the camera B 102 in step S505.

In step S507, the camera B 102 receives the learning request transmitted from the management server 100, and acquires the supervisory data included in the learning request.

In step S508, the camera B 102, in response to the learning request received from the management server 100, executes learning using the supervisory data acquired in step S507 (second learning mode). Learning of the same level as that executed by the camera A 101 in step S501 can be executed by the camera B 102.

In step S509, the management server 100 transmits, to the camera C 103, a learning request that is a request to execute learning. The learning request includes the supervisory data processed for transmission to the camera C 103 in step S505.

In step S510, the camera C 103 receives the learning request transmitted from the management server 100, and acquires the supervisory data included in the learning request.

In step S511, the camera C 103, in response to the learning request received from the management server 100, executes learning using the supervisory data acquired in step S510 (second learning mode). Learning of the same level as that executed by the camera A 101 in step S501 can be executed by the camera C 103.

Note that the processing from step S509 to step S511 need not be executed after the processing from step S506 to step S508, and may be executed concurrently and in parallel with the processing from step S506 to step S508.

Figure 6B:
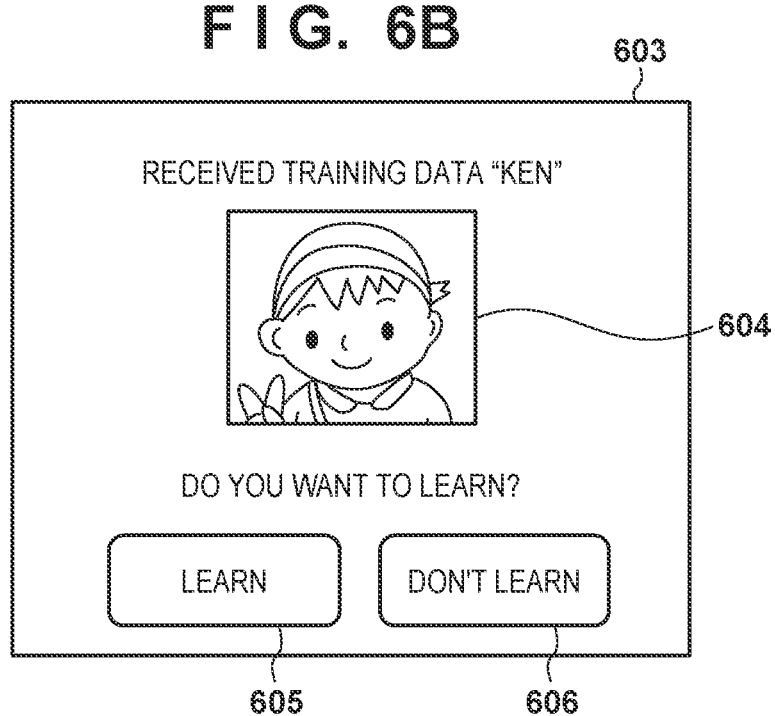

Furthermore, a configuration may be adopted such that, in steps S508 and S511, confirmation is made with the user as to whether or not the user wants learning to be executed, before executing the learning in the second learning mode in response to the learning request received from the management server 100 in steps S507 and S510, and the learning is executed only when user permission is granted. FIG. 6B illustrates an operation screen of the camera B 102, camera C 103 in which a user can select whether or not to learning is to be executed in the second learning mode in response to a learning request from the management server 100. An operation screen 603 is displayed on the display device 306 of the camera B 102, camera C 103. An image 604 indicates the supervisory image data received from the management server 100. Buttons 605 and 606 are displayed on the touch panel on the display screen 603. The button 605 is selected if the user wants learning to be executed, and the button 606 is selected if the user does not want learning to be executed. It suffices for the user to select the button 606 on the operation screen 603 illustrated in FIG. 6B if the user does not want learning to be executed in the second learning mode in response to the learning request from the management server 100. Accordingly, the learning function in the second learning mode, which is executed in response to a learning request from the management server 100, can be disabled.

Furthermore, while processing in which the camera A 101 transmits supervisory data, and the camera B 102 and the camera C 103 receive supervisory data is illustrated as an example in FIG. 5, the camera A 101 can also receive supervisory data from other cameras. Similarly, the camera B 102 and the camera C 103 can also provide supervisory data that the camera has used to perform learning to other cameras.

Sequence for Updating Learning Subjects

Next, a sequence of processing for automatically updating learning subjects common to a group, which are managed in the group management table illustrated in FIG. 2A, will be described with reference to FIG. 8.

Figure 8:
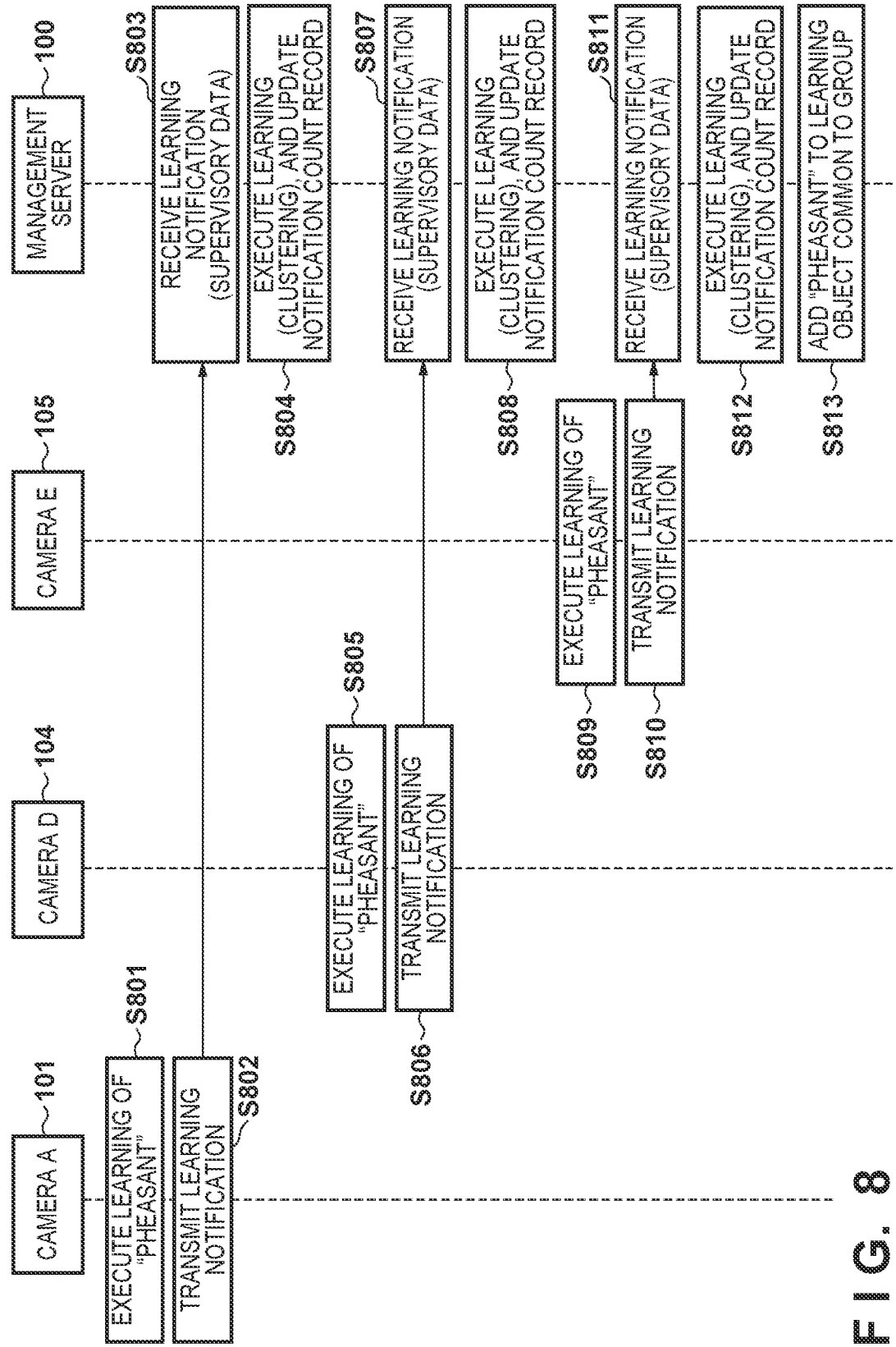
FIG. 8 is a diagram illustrating an example of a sequence of processing for updating learning subjects in the system according to the first embodiment.

FIG. 8 illustrates an example of a sequence of processing in which "PHEASANT" is newly added as a learning subject label common to group Y in a case in which all cameras belonging to group Y have executed learning of the wild bird pheasant one hundred or more times.

In step S801, the camera A 101 executes learning of an image of a pheasant. For example, the processing in step S801 is executed at a timing when the user A shoots an image of a pheasant. The details of the learning processing are as described in step S501.

In step S802, the camera A 101 transmits, to the management server 100, a learning notification indicating that learning was executed. The learning notification includes the supervisory data used in the learning. The supervisory data includes a pair of supervisory image data including the image of a pheasant and learning subject label information "PHEASANT".

In step S803, the management server 100 receives the learning notification transmitted by the camera A 101, and acquires the supervisory data included in the learning notification.

In step S804, the management server 100 executes clustering (unsupervised learning) of the supervisory image data received in step S803, and updates the reception history of learning notifications on a cluster basis. FIG. 2C illustrates an example of information for managing the reception history of learning notifications from the cameras A to E (referred to hereinafter as a "learning notification management table"). As illustrated in FIG. 2C, the reception history of learning notifications is managed for each cluster. The cluster ID "00004" is the identifier of the cluster that the supervisory image data has been classified into as a result of the clustering in the current step. The indicator "PHEASANT" in the label column corresponds to the learning subject label information "PHEASANT" of the supervisory image data subjected to clustering in the current step. As learning notification counts, the number of times learning notifications including supervisory image data corresponding to the cluster ID have been received is stored and updated for each camera. "125 times" in the column for camera A 101 indicates that learning notifications including supervisory image data similar to "PHEASANT" have been received 125 times by the camera A 101 so far, and indicates that the count has been updated from 124 times to 125 times as a result of the current step.

In steps S805 to S808, processing similar to that in steps S801 to S804 is executed for camera D 104.

In steps S809 to S812, processing similar to that in steps S801 to S804 is executed for camera E 105.

FIG. 2D illustrates an example of the learning notification management table updated in steps S808 and S812. In FIG. 2D, the learning notification count of camera D 104 and the learning notification count of camera E 105 for cluster ID "00004" are each incremented by one and updated when compared with FIG. 2C. This means that all cameras belonging to group Y have executed learning of "PHEASANT" one hundred times or more.

In step S813, the management server 100 newly adds "PHEASANT" as a learning subject common to group Y. FIG. 2E illustrates an example of the group management table updated in step S813. As illustrated in FIG. 2E, "PHEASANT" is added as a learning subject common to group Y.

According to the first embodiment, in the system constituted by the cameras 101 to 105 and the management server 100, if a given camera A 101 executes learning of a subject, the management server 100 can automatically select other cameras B 102, C 103 desiring to execute learning of the same subject and share the supervisory data used for the learning. Thus, learning of the same level can be executed by the sharing destination cameras B 102, C 103.

Furthermore, as a result of the management server 100 automatically updating learning subjects in accordance with the learning states of the cameras A 101 to E 105, the most suitable subjects can always be selected as learning targets even if the learning subject images of individual cameras change.

Second Embodiment

Next, the second embodiment will be described.

In the first embodiment, a system constituted by cameras and a management server was described. In contrast, a system that does not include a management server and is constituted only by cameras will be described in the second embodiment. Note that in the following, an explanation will be provided focusing on the differences from the first embodiment, and explanation of points similar to the first embodiment will be omitted.

System Configuration

First, a system configuration according to the second embodiment will be described with reference to FIG. 9.

The system according to the present embodiment is constituted by cameras 101 to 105 (cameras A to E) being connected so as to be capable of communicating with one another. In the present embodiment, it is assumed that the cameras 101 to 105 have a function capable of communicating with one another via a network such as the Internet. However, the cameras 101 to 105 do not necessarily need to have a built-in Internet communication function, and may, for example, be configured so as to have a wireless LAN communication function and to perform communication between the cameras via a device, such as a smartphone, that has a tethering function. Furthermore, while not illustrated in the drawings, a configuration may be adopted in which a relay server that performs routing control of the communication between cameras is arranged on a network, and communication is performed via the relay server.

Similarly to the first embodiment, the cameras 101 to 105 each have a unique learning model, and have a function for executing learning of images using supervisory data. Furthermore, similarly to the first embodiment, the cameras 101 to 105 form groups with cameras that have common learning-target subjects. In the present embodiment, the cameras 101 to 105 each manage the group management table. The specification of the group management table is similar to that illustrated in FIG. 2A in the first embodiment. Furthermore, the supervisory image data specification management table is also similar to that illustrated in FIG. 2B in the first embodiment. In addition, the configuration and functions of the cameras according to the present embodiment are similar to those in the first embodiment.

Sequence of Learning Processing

Next, an example of a sequence of processing performed by the cameras A 101 to C 103, in a case in which the cameras A 101 to C 103, among the cameras A 101 to E 105 constituting the system according to the second embodiment, perform image learning, will be described with reference to FIG. 10.

Figure 9:
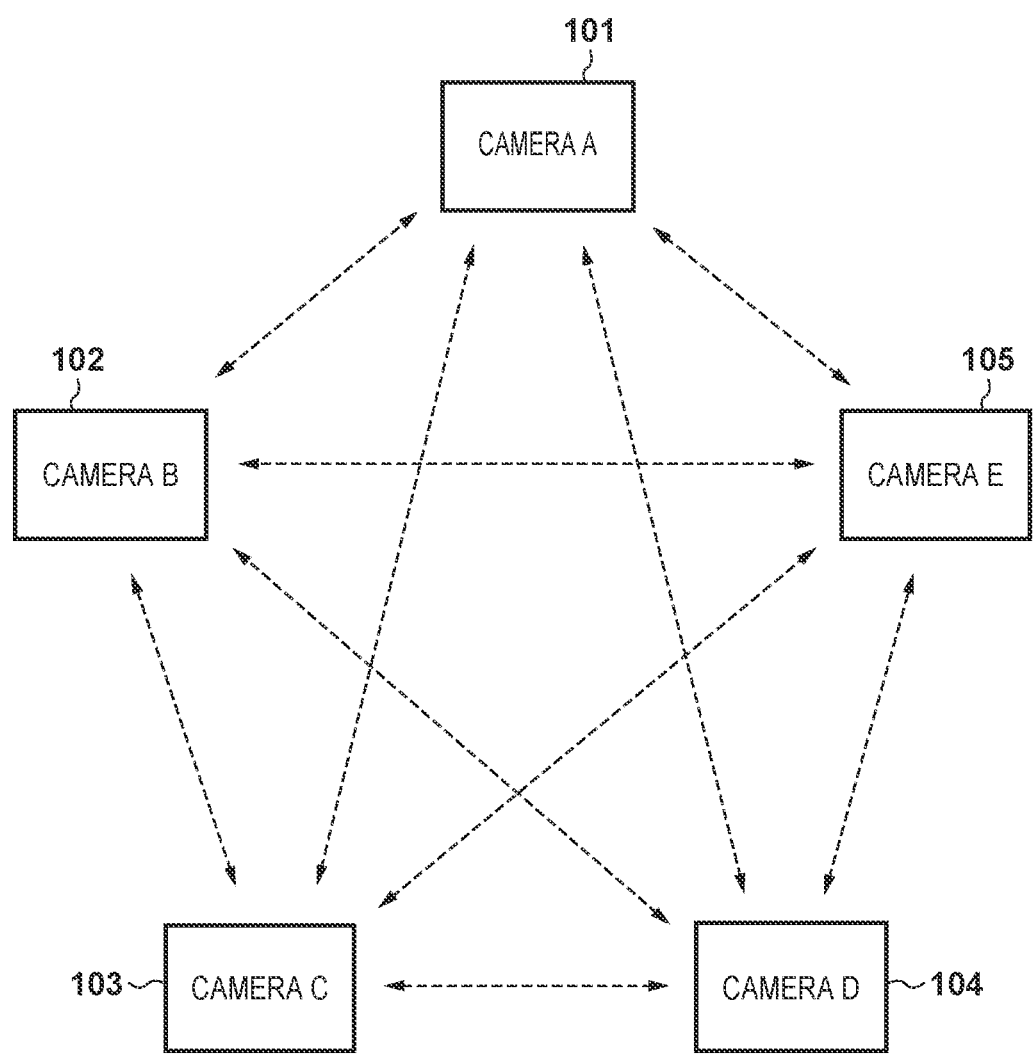
FIG. 9 is a system configuration diagram according to the second embodiment.

The following describes a sequence of processing that is performed if a given camera executes learning of a subject in the system configuration illustrated in FIG. 9 and that is for causing other cameras desiring to execute learning of the same subject (i.e., other cameras having the same learning subject label) to execute learning of the same level.

For example, FIG. 10 illustrates an example of a sequence of processing in which, in a case in which the camera A 101 performs learning of the subject "KEN", the camera A 101 transmits supervisory image data generated in the learning of the subject "KEN" to the camera B 102 and the camera C 103 so that learning of the same level can be executed by the camera B 102 and the camera C 103.

In step S1001, the camera A 101 executes learning of "KEN". The details of the learning processing are as already described in step S501 in FIG. 5.

In step S1002, the camera A 101 executes processing for selecting cameras with which the supervisory data used in step S1001 for the learning is to be shared. In the processing for selecting sharing destinations, the camera A 101 executes processing similar to that in step S504 in FIG. 5.

In step S1003, the camera A 101 processes the supervisory data to be shared so that the supervisory data is converted into formats that can be input to the learning models of the cameras selected in step S1002. In the processing of the supervisory data, the camera A 101 executes processing similar to that in step S505 in FIG. 5.

In step S1004, the camera A 101 transmits, to the camera B 102, a learning request that is a request to execute learning. The learning request includes the supervisory data processed for transmission to the camera B 102 in step S1003.

In step S1005, the camera B 102 receives the learning request transmitted from the camera A 101, and acquires the supervisory data included in the learning request.

In step S1006, the camera B 102 executes learning using the supervisory data acquired in step S1005. Learning of the same level as that executed by the camera A 101 in step S1001 can be executed by the camera B 102.

In step S1007, the camera A 101 transmits, to the camera C 103, a learning request that is a request to execute learning. The learning request includes the supervisory data processed for transmission to the camera C 103 in step S1003.

In step S1008, the camera C 103 receives the learning request transmitted from the camera A 101, and acquires the supervisory data included in the learning request.

In step S1009, the camera C 103 executes learning using the supervisory data acquired in step S1008. Learning of the same level as that executed by the camera A 101 in step S1001 can be executed by the camera C 103.

Note that the processing from step S1007 to step S1009 need not be executed after the processing from step S1004 to step S1006, and may be executed concurrently and in parallel with the processing from step S1004 to step S1006.

Furthermore, a configuration may be adopted such that, in steps S1006 and S1009, confirmation is made with the user as to whether or not the user wants learning to be executed, before executing learning in response to the learning request received from the camera A 101, and the learning is executed only when user permission is granted, similarly to steps S508 and S511 in FIG. 5.

Furthermore, while processing in which the camera A 101 transmits supervisory data, and the camera B 102 and the camera C 103 receive supervisory data is illustrated as an example in FIG. 10, the camera A 101 can also receive supervisory data from other cameras. Similarly, the camera B 102 and the camera C 103 can also provide supervisory data that the camera has used to perform learning to other cameras.

Furthermore, a configuration may be adopted such that each camera, in response to a learning request received from another camera, executes the sequence for updating learning subjects described in FIG. 8 in the first embodiment.

According to the second embodiment, in the system constituted by the cameras 101 to 105, if a given camera A 101 executes learning of a subject, the camera A 101 can automatically select other cameras B 102 and C 103 desiring to execute learning of the same subject and share the supervisory data used for the learning. Thus, learning of the same level can be executed by the sharing destination cameras B 102 and C 103.

Note that, while an explanation is provided in the first and second embodiments taking, as an example, a configuration in which the cameras 101 to 105 have learning functions, there is no limitation to this. A configuration may be adopted such that there are edge computers or servers corresponding to the cameras 101 to 105, and these edge computers or servers have learning functions. These edge computers or servers transmit, to the corresponding cameras 101 to 105, parameters for subject recognition obtained by executing learning, and the cameras 101 to 105 perform subject recognition using these parameters. In this case, the management server 100 selects edge computers or servers corresponding to the cameras 101 to 105 rather than selecting the cameras 101 to 105.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information management apparatus comprising at least one processor or circuit configured to perform operations of the following units:
a communication unit configured to communicate with a plurality of image capture apparatuses each of which has a learning function; and
a control unit configured to control the communication with the plurality of image capture apparatuses performed by the communication unit,
wherein the control unit,
if supervisory data generated when a first image capture apparatus executed a learning function is received from the first image capture apparatus via the communication unit, selects, from among the plurality of image capture apparatuses, a second image capture apparatus, other than the first predetermined external image capture apparatus, with which the supervisory data used for the learning function of the first image capture apparatus is to be shared, and
performs control so that the supervisory data used for the learning function of the first image capture apparatus is transmitted to the second image capture apparatus.

2. The apparatus according to claim 1,
wherein the learning function is a function for recognizing a predetermined subject using a captured image and the supervisory data, and
the supervisory data includes supervisory image data of the predetermined subject and label information indicating the predetermined subject.

3. The apparatus according to claim 1,
wherein the control unit manages the plurality of image capture apparatuses so that apparatuses having a learning-target subject in common are managed as belonging to the same group, and
selects an image capture apparatus belonging to the same group as the first image capture apparatus as an image capture apparatus with which the supervisory data used for the learning function of the first image capture apparatus is to be shared.

4. The apparatus according to claim 1,
wherein the control unit has a table in which the number of times the supervisory data is received is recorded for each of the plurality of image capture apparatuses, and newly adds, as a learning-target subject common to a group to which the first capture apparatus belongs, a subject for which the number of times the supervisory data is received exceeds a predetermined reference, among label information of subjects of the plurality of image capture apparatuses recorded in the table.

5. The apparatus according to claim 3, wherein the control unit processes the supervisory data used for the learning function of the first image capture apparatus so that the supervisory data has a format that can be used in the second image capture apparatus.

6. An image capture apparatus having a learning function, comprising:
at least one processor or circuit configured to perform operations of the following units:
a communication unit configured to communicate with an information management apparatus that manages supervisory data generated when the image capture apparatus executed the learning function; and
a control unit configured to transmit the supervisory data used for the learning function of the image capture apparatus and to be shared with other image capture apparatus having a learning function, to the information management apparatus via the communication unit.

7. The apparatus according to claim 6, wherein the learning function is a function for recognizing a predetermined subject using a captured image and the supervisory data, and
the supervisory data includes supervisory image data of the predetermined subject and label information indicating the predetermined subject.

8. The apparatus according to claim 7, wherein the learning function includes a first learning mode for executing learning using supervisory image data generated from a captured image and a second learning mode for executing learning in response to a learning request from the information management apparatus using the supervisory image data included in the supervisory data received from the information management apparatus.

9. The apparatus according to claim 8, wherein the learning function is capable of disabling the second learning mode, and
the control unit does not execute learning in the second learning mode if the second learning mode is disabled.

10. An image capture apparatus having a learning function, comprising
at least one processor or circuit configured to perform operations of the following units:
a communication unit configured to communicate with other image capture apparatus having a learning function; and
a control unit configured to control the communication with the other image capture apparatus performed via the communication unit,
wherein the control unit
selects, from among a plurality of image capture apparatuses, a second image capture apparatus with which supervisory data generated when the image capture apparatus executed the learning function is to be shared, and
performs control so that the supervisory data used for the learning function of the image capture apparatus is transmitted to the second image capture apparatus via the communication unit.

11. The apparatus according to claim 10, wherein the learning function is a function for recognizing a predetermined subject using a captured image and the supervisory data, and
the supervisory data includes supervisory image data of the predetermined subject and label information indicating the predetermined subject.

12. The apparatus according to claim 10, wherein the control unit manages image capture apparatuses having a learning-target subject in common with the image capture apparatus as belonging to the same group, and
selects an image capture apparatus belonging to the same group as the image capture apparatus as the second image capture apparatus with which the supervisory data is to be shared.

13. The apparatus according to claim 10, wherein the control unit processes the supervisory data used for the learning function of the image capture apparatus so that the supervisory data has a format that can be used in the second image capture apparatus.

14. The apparatus according to claim 11, wherein the control unit receives supervisory data generated when the other image capture apparatus executed the learning function from the other image capture apparatus via the communication unit, and
the learning function includes a function for executing learning using supervisory image data generated from a captured image and a function for executing learning using supervisory image data included in the supervisory data received from the other image capture apparatus.

15. A method of controlling an information management apparatus that includes a communication unit configured to communicate with a plurality of image capture apparatuses each of which has a learning function and that controls the communication with the plurality of image capture apparatuses performed by the communication unit,
the method comprising:
if supervisory data generated when a first image capture apparatus executed a learning function is received from the first image capture apparatus via the communication unit, selecting, from among the plurality of image capture apparatuses, a second image capture apparatus, other than the first image capture apparatus, with which the supervisory data used for the learning function of the first image capture apparatus is to be shared; and
transmitting the supervisory data used for the learning function of the first image capture apparatus to the second image capture apparatus.

16. A method of controlling an image capture apparatus having a learning function, comprising:
communicating with an information management apparatus that manages supervisory data generated when the image capture apparatus executed the learning function; and
transmitting the supervisory data used for the learning function of the image capture apparatus and to be shared with other image capture apparatus having a learning function, to the information management apparatus.

17. A method of controlling an image capture apparatus having a learning function, a communication unit configured to communicate with other image capture apparatus having a learning function, and a control unit configured to control the communication with the other image capture apparatus performed via the communication unit, the method comprising:

selecting, from among a plurality of image capture apparatuses, a second image capture apparatus with which supervisory data generated when the image capture apparatus executed the learning function is to be shared; and transmitting the supervisory data used for the learning function of the image capture apparatus to the second image capture apparatus via the communication unit.

18. A non-transitory computer-readable storage medium storing a program for causing a computer to execute a method of controlling an information management apparatus that includes a communication unit configured to communicate with a plurality of image capture apparatuses each of which has a learning function and that controls the communication with the plurality of image capture apparatuses performed by the communication unit, the method comprising:

if supervisory data generated when a first image capture apparatus executed a learning function is received from the first image capture apparatus via the communication unit, selecting, from among the plurality of image capture apparatuses, a second image capture apparatus, other than the first image capture apparatus, with which the supervisory data used for the learning function of the first image capture apparatus is to be shared; and transmitting the supervisory data used for the learning function of the first image capture apparatus to the second image capture apparatus.

19. A non-transitory computer-readable storage medium storing a program for causing a computer to execute a method of controlling an image capture apparatus having a learning function, comprising:

communicating with an information management apparatus that manages supervisory data generated when the image capture apparatus executed the learning function; and transmitting the supervisory data used for the learning function of the image capture apparatus and to be shared with other image capture apparatus having a learning function, to the information management apparatus.

20. A non-transitory computer-readable storage medium storing a program for causing a computer to execute a method of controlling an image capture apparatus having a learning function, a communication unit configured to communicate with other image capture apparatus having a learning function, and a control unit configured to control the communication with the other image capture apparatus performed via the communication unit, the method comprising:

selecting, from among a plurality of image capture apparatuses, a second image capture apparatus with which supervisory data generated when the image capture apparatus executed the learning function is to be shared; and transmitting the supervisory data used for the learning function of the image capture apparatus to the second image capture apparatus via the communication unit.

* * * * *